April 16, 1940.  W. W. CANNON ET AL  2,197,142
BEVERAGE DISPENSING DEVICE
Original Filed Nov. 10, 1938
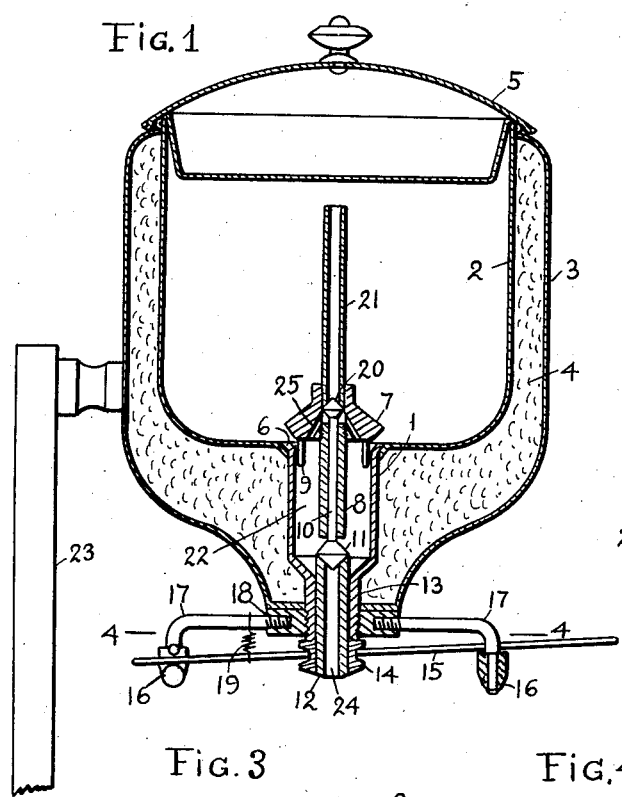
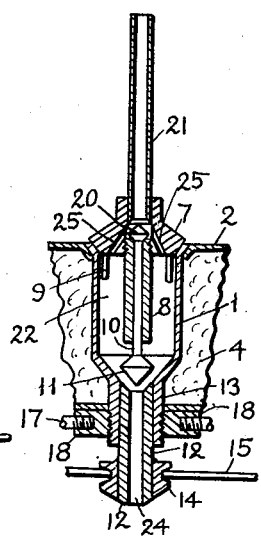
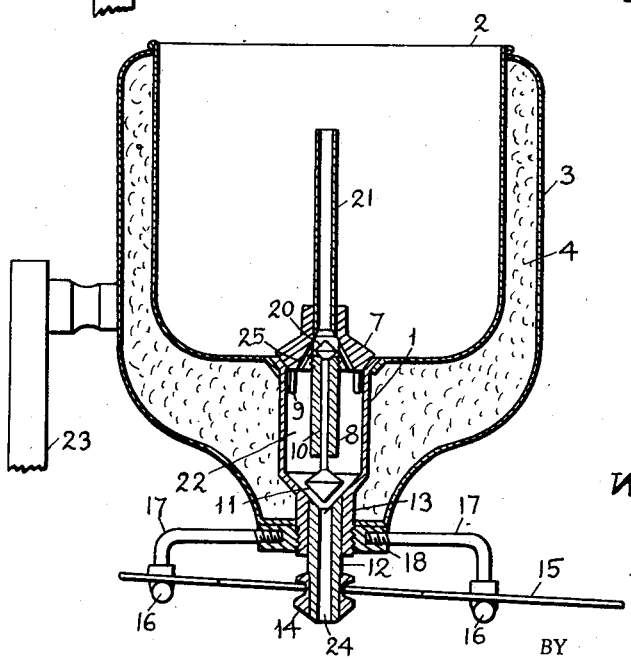
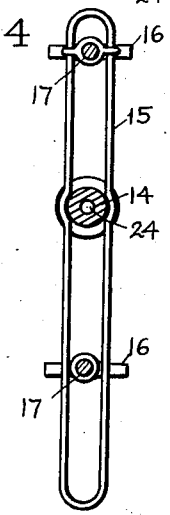
WILLIAM W. CANNON
JULIUS HURWITZ
INVENTOR.
BY John P. Nixonow
ATTORNEY.

Patented Apr. 16, 1940

2,197,142

UNITED STATES PATENT OFFICE 2,197,142

BEVERAGE DISPENSING DEVICE

William W. Cannon and Julius Hurwitz, New York, N. Y., assignors, by mesne assignments, to S. R. Sperans, New York, N. Y.

Application November 10, 1938, Serial No. 239,802
Renewed December 26, 1939

10 Claims. (Cl. 221—112)

Our invention relates to beverage dispensing devices and has particular reference to devices for dispensing beverages of other liquids in measured quantities.

Our invention has for its object to provide a dispensing device with a valve which can be manually operated for delivering a measured quantity of a beverage such as cream from a container. For this purpose we provide a casing extending from the bottom of the container and adapted to hold a desired quantity of the liquid. The container has valves on top and bottom, manually operated for filling and discharging the casing. Means is also provided to admit air into the casing when the upper valve is closed for releasing the liquid through the lower valve.

Another object of our invention is to provide an interlocking means between the valves so that the upper valve can be opened only after the lower valve has been closed, and the lower valve can be opened only after the upper valve has been closed. This is accomplished in our device by providing a movable seat for the lower valve and a slidable member extending from the lower valve and engaging the upper valve so that by raising the seat the lower valve is closed and then the upper valve raised by the sliding member. The air vent valve is also operated by the sliding member so that the complete sequence of operation of the valves is automatically effected by the simple movement of a handle.

Another object of our invention is to provide a yieldable means to keep the upper valve open and the lower valve closed thereby practically eliminating any drip of the liquid when the valve is not used. This arrangement has an added advantage in that the chamber in the casing is always filled and ready to be discharged thereby expediting the dispensing operations.

Our invention is more fully described in the accompanying specification and drawing in which—

Fig. 1 is a sectional elevational view of our dispensing device in the inoperative position.

Fig. 2 is a fractional sectional view of the same in a dispensing position.

Fig. 3 is a sectional elevational view of a modified device.

Fig. 4 is a sectional view taken on the line 4—4 of Fig. 1.

Our dispensing device consists of a valve casing 1 fitted at the bottom of a container 2 having a jacket 3 on the outside, the space in the jacket being filled with a rock wool 4 or similar heat insulating material. A jacketed cover 5 is provided on top of the container.

The upper end of the casing 1 is flush with the bottom of the container and has a tapering valve seat 6 for a mushroom or poppet valve 7 having a hollow stem 8 extending into the casing.

The valve has depending lugs 9 sliding in the casing 1 and guiding the valve in its movement when it is raised above the seat 6. A rod 10 is slidably fitted in the stem 8 and has a valve 11 at the lower end engaging a corresponding seat at the upper end of a tubular member 12. The latter slides in a narrow lower portion 13 of the casing 1 and extends to the outside, having a grooved collar 14 at the end. The latter is engaged by the middle portion of a handle 15 which is suitably curved around the collar so that it cannot slide lengthwise. The end portions of the handle are retained by T-pieces 16 rotatively mounted on the ends of a bracket arms 17 extending from a ring 18 threaded on the lower end of the tubular member 12. A spring 19 keeps the handle in the raised position with the tubular member 12 pushed up as shown in Fig. 1. The valve seat on the upper end of the tubular member 12 engages the valve 11, pushing the rod 10 upward.

The rod has a valve 20 at the upper end engaging the lower end of an air vent tube 21 extending to the top of the container. The rod 10, being raised, seats the valve 20 and raises the valve 7 above its seat. The valve 7 remains thus raised by the action of the spring 19 when the handle is left free. As a result, the chamber 22 in the casing 1 is filled with the liquid from the container, its escape being prevented by the valve 11 which is seated on the tubular member 12. The chamber 22 is made so that it holds a desired quantity of the liquid as, for instance, one ounce if the device is intended for dispensing cream into coffee cups. This quantity of the liquid is ready to be delivered. For convenience in handling the device it may be mounted on a standard 23 extending from a suitable base (not shown).

When it is desired to extract a measure of the liquid corresponding to the volume of the chamber 22, the handle 15 is depressed against the tension of the spring 19 until the front portion of the handle comes to rest against the front T-piece 16. The valve 7 follows the downward movement of the handle, being supported through the rod 10 on the upper end of the tubular member 12, until it comes to rest on the seat 6 thereby closing the chamber 22 from the container. With the further downward movement of the handle the tubular member 12 leaves the valve 11 and takes the position shown in Fig. 2, the sides of the valve seat forming continuation of the tapering sides of the bottom portion of the chamber 22 so that the liquid can freely flow from the chamber through the hole 24 in the tubular chamber 12 into a suitable receptacle placed under the valve. The rod 10 slides by gravity downward until the valve 20 comes to rest against the upper edge of the stem 8 thereby opening the lower end of the air vent tube 21 for admitting air through ducts 25 into the chamber 22. As a result, the liquid rapidly escapes from the chamber 22 into the receptacle.

Upon release of the handle it is pulled upward by the spring 19, closing the lower valve and opening the upper valve, as shown in Fig. 1, thereby admitting the liquid into the chamber 22. A modified arrangement is shown in Fig. 3. The valve mechanism is the same as in Fig. 1 but the handle 15 has no spring so that it normally rests at both ends on the T-pieces 16. With this arrangement the chamber 22 normally remains closed, the lower valve 11 being then opened so that the chamber 22 remains empty. In order to deliver a measured quantity of the liquid, the handle 15 is raised thereby admitting the liquid into the chamber 22, and then released again, closing the upper valve 7 and opening the lower valve 11 as shown in Fig. 3.

This arrangement of the valves has an advantage that there is practically no drip from the valve when it is not used because only a narrow and relatively short hole 24 remains open at the bottom, and the liquid cannot flow from this hole because it is closed on top by the valve 11. Another advantage results from the fact that the chamber 22 is always filled with the liquid so that it can be quickly emptied. The dispensing operation can be quickly and conveniently performed using but a single hand, by holding a receptacle between the fingers and using one finger to depress the handle.

It should be noted that every time the valve 7 is opened, the air filling the chamber 22 is allowed to escape through the liquid in the container 2. The bubbles of the air, rapidly rising through the liquid, stir the latter and help to maintain its uniform consistency.

It is understood that our device can be further modified within the scope of the appended claims.

We claim as our invention:

1. A beverage dispensing device comprising a container, a casing at the bottom of the container, a tubular member slidably fitted in the lower portion of the casing and having a valve seat at the upper end, a valve closing the upper end of the casing, a hollow stem extending from the valve, a rod slidably engaging the stem, a valve at the lower end of the stem closing the valve seat on the tubular member, means to manually move the tubular member, the tubular member in the low position forming an outlet for the liquid in the casing, means to limit the downward movement of the rod in the stem so as to hold the tubular member valve above the valve seat when the tubular member is in the low position and the casing valve closes the casing, and a valve adapted to admit air into the casing when the tubular member valve is open, the air valve being adapted to be closed by the rod when the tubular member is raised thereby closing the tubular member valve, the casing valve being adapted to be raised by the rod with the further upward movement of the tubular member thereby admitting a liquid from the container into the casing.

2. A beverage dispensing device comprising a container, a casing at the bottom of the container, a tubular member slidably fitted in the lower portion of the casing and having a valve seat at the upper end, a valve closing the upper end of the casing, a hollow stem extending from the valve, a rod slidably engaging the stem, a valve at the lower end of the stem closing the valve seat on the tubular member, means to manually move the tubular member, the tubular member in the low position forming an outlet for the liquid in the casing, means to limit the downward movement of the rod in the stem so as to hold the tubular member valve above the valve seat when the tubular member is in the low position and the casing valve closes the casing, a valve adapted to admit air into the casing when the tubular member valve is open, the air valve being adapted to be closed by the rod when the tubular member is raised thereby closing the tubular member valve, the casing valve being adapted to be raised by the rod with the further upward movement of the tubular member thereby admitting a liquid from the container into the casing, and a yieldable means to keep the tubular member in the raised position with the lower valve closed and the casing valve opened.

3. A beverage dispensing device comprising a container, a casing at the bottom of the container, a tubular member slidably fitted in the lower portion of the casing and having a valve seat at the upper end, a valve closing the upper end of the casing, a hollow stem extending from the valve, a rod slidably engaging the stem, a valve at the lower end of the stem closing the valve seat on the tubular member, means to manually move the tubular member, the tubular member in the low position forming an outlet for the liquid in the casing, means to limit the downward movement of the rod in the stem so as to hold the tubular member valve above the valve seat when the tubular member is in the low position and the casing valve closes the casing, an air vent tube extending from the casing valve to the top of the container, the upper valve having ducts extending from the vent tube to the under side of the casing valve, and a valve in the vent tube, the tubular member being adapted to be closed by the lower valve when the tubular member is raised, the rod being adapted to raise the upper valve when the tubular member is raised thereby admitting liquid from the container into the casing.

4. A beverage dispensing device comprising a container, a casing at the bottom of the container, a tubular member slidably fitted in the lower portion of the casing and having a valve seat at the upper end, a valve closing the upper end of the casing, a hollow stem extending from the valve, a rod slidably engaging the stem, a valve at the lower end of the stem closing the valve seat on the tubular member, means to manually move the tubular member, the tubular member in the low position forming an outlet for the liquid in the casing, means to limit the downward movement of the rod in the stem so as to hold the tubular member valve above the valve seat when the tubular member is in the low position and the casing valve closes the casing, and a valve adapted to admit air into the casing when the tubular member valve is open, the air valve being adapted to be closed by the rod when the tubular member is raised thereby closing the tubular member valve, the casing valve being adapted to be raised by the rod with the further upward movement of the tubular member thereby admitting a liquid from the container into the casing, and means to guide the upper valve in its movements.

5. A beverage dispensing device comprising a container, a casing at the bottom of the container, a tubular member slidably fitted in the lower portion of the casing and having a valve seat at the upper end, a valve closing the upper end of the casing, a hollow stem extending from the valve, a rod slidably engaging the stem, a valve at the lower end of the stem closing the valve seat on the tubular member, means to manually move the tubular member, the tubular member in the low position forming an outlet for the liquid in the casing, means to limit the downward movement of the rod in the stem so as to hold the tubular member valve above the valve seat when the tubular member is in the low position and the casing valve closes the casing, and a valve adapted to admit air into the casing when the tubular member valve is open, the air valve being adapted to be closed by the rod when the tubular member is raised thereby closing the tubular member valve, the casing valve being adapted to be raised by the rod with the further upward movement of the tubular member thereby admitting a liquid from the container into the casing, and guiding members extending from the upper valve into the casing.

6. A beverage dispensing device comprising a container, a casing at the bottom of the container, a tubular member slidably fitted in the lower portion of the casing and having a valve seat at the upper end, a valve closing the upper end of the casing, a hollow stem extending from the valve, a rod slidably engaging the stem, a valve at the lower end of the stem closing the valve seat on the tubular member, means to manually move the tubular member, the tubular member in the low position forming an outlet for the liquid in the casing, means to limit the downward movement of the rod in the stem so as to hold the tubular member valve above the valve seat when the tubular member is in the low position and the casing valve closes the casing, and a valve adapted to admit air into the casing when the tubular member valve is open, the air valve being adapted to be closed by the rod when the tubular member is raised thereby closing the tubular member valve, the casing valve being adapted to be raised by the rod with the further upward movement of the tubular member thereby admitting a liquid from the container into the casing, and means to limit the movements of the tubular member.

7. A beverage dispensing valve for a container comprising a casing for the lower portion of the container having an opening at the top for communication with the container, a tubular member slidably fitted in the lower portion of the casing having a valve seat at the top, a lower valve adapted to close the valve seat, means to manually move the tubular member, means to limit the movements of the tubular member, a valve closing the upper end of the casing, guiding members extending from the valve into the casing, a stem on the upper valve, a rod extending from the lower valve and slidably engaging the upper valve stem, means to limit the downward movement of the stem so as to retain the lower valve open when the tubular member is in the lowest position thereby permitting the upper valve to close the casing, and means to admit air into the casing when the lower valve is opened, the lower valve being adapted to close the tubular member valve seat when the tubular member is raised.

8. A beverage dispensing valve for a container comprising a casing for the lower portion of the container having an opening at the top for communication with the container, a tubular member slidably fitted in the lower portion of the casing having a valve seat at the top, a lower valve adapted to close the valve seat, means to manually move the tubular member, means to limit the movements of the tubular member, a valve closing the upper end of the casing, guiding members extending from the valve into the casing, a stem on the upper valve, a rod extending from the lower valve and slidably engaging the upper valve stem, means to limit the downward movement of the stem so as to retain the lower valve open when the tubular member is in the lowest position thereby permitting the upper valve to close the casing, and means to admit air into the casing when the lower valve is opened, the lower valve being adapted to close the tubular member valve seat when the tubular member is raised, the lower portion of the casing being of a smaller diameter than the upper portion, the walls of the upper portion of the casing tapering toward the lower portion, the valve seat in the tubular member forming a continuation of the tapering walls of the casing when the tubular member is in the lowest position thereby facilitating the flow of a liquid from the casing.

9. A beverage dispensing valve for a container comprising a casing for the lower portion of the container having an opening at the top for communication with the container, a tubular member slidably fitted in the lower portion of the casing having a valve seat at the top, a lower valve adapted to close the valve seat, a bracket extending from the lower portion of the casing, a handle removably supported on the bracket and engaging the lower end of the tubular member, means to limit the movements of the handle, a valve closing the upper end of the casing, guiding members extending from the valve into the casing, a stem on the upper valve, a rod extending from the lower valve and slidably engaging the upper valve stem, means to limit the downward movement of the stem so as to retain the lower valve open when the tubular member is in the lowest position thereby permitting the upper valve to close the casing, and means to admit air into the casing when the lower valve is opened, the lower valve being adapted to close the tubular member valve seat when the tubular member is raised.

10. A beverage dispensing valve for a container comprising a casing for the lower portion of the container having an opening at the top for communication with the container, a tubular member slidably fitted in the lower portion of the casing having a valve seat at the top, a lower valve adapted to close the valve seat, a bracket extending from the lower portion of the casing, a handle removably supported on the bracket and engaging the lower end of the tubular member, means to limit the movements of the handle, a spring adapted to keep the handle and the tubular member in the raised position, a valve closing the upper end of the casing, guiding members extending from the valve into the casing, a stem on the upper valve, a rod extending from the lower valve and slidably engaging the upper valve stem, means to limit the downward movement of the stem so as to retain the lower valve open when the tubular member is in the lowest position thereby permitting the upper valve to close the casing, and means to admit air into the casing when the lower valve is opened, the lower valve being adapted to close the tubular member valve seat when the tubular member is raised.

WILLIAM W. CANNON.
JULIUS HURWITZ.